United States Patent [19]

Tiffany

[11] Patent Number: 5,094,422
[45] Date of Patent: Mar. 10, 1992

[54] STACKABLE FLARE BASE

[76] Inventor: Carlton R. Tiffany, 225 Hill Rd., Douglassville, Pa. 19518

[21] Appl. No.: 506,941

[22] Filed: Apr. 9, 1990

[51] Int. Cl.$^5$ ............................................. F16M 13/00
[52] U.S. Cl. ................................... 248/519; 248/346
[58] Field of Search ................ 248/519, 520, 538, 539, 248/346; 206/506, 507; 411/344, 345, 341, 161, 162, 531, 544, 185, 186, 187, 201, 154, 155, 368, 369; 135/67, 77; 108/91

[56] References Cited

U.S. PATENT DOCUMENTS

| 1,099,027 | 6/1914 | Crozier | 411/162 |
|---|---|---|---|
| 1,776,354 | 9/1930 | Edmands. | |
| 2,005,895 | 6/1935 | Hengstenberg | 411/461 |
| 2,354,802 | 8/1944 | Doke | 403/238 X |
| 2,623,633 | 12/1952 | Bladow | 108/91 X |
| 3,307,812 | 3/1967 | Brenner | 248/539 |
| 3,315,720 | 4/1967 | Gutshall | 411/544 |
| 3,883,037 | 5/1975 | Seiller | 206/507 X |
| 3,905,324 | 9/1975 | English | 248/520 X |
| 3,955,786 | 5/1976 | Duddy | 248/539 X |
| 3,964,706 | 6/1976 | Adams | 248/538 X |
| 4,061,971 | 12/1977 | Barrons | 248/346 X |
| 4,148,258 | 4/1979 | Powers | 248/520 X |
| 4,201,975 | 5/1980 | Marcus | 248/519 X |
| 4,259,160 | 7/1985 | Chan et al. | 248/163.1 X |
| 4,597,550 | 7/1986 | Rice, Sr. | 248/346 |
| 4,858,349 | 8/1989 | Walsh et al. | 411/544 X |
| 4,927,117 | 5/1990 | Gainey | 248/539 |

Primary Examiner—Gary L. Smith
Assistant Examiner—Michael J. Milano
Attorney, Agent, or Firm—Dilworth & Barrese

[57] ABSTRACT

A device and assembly for holding emergency flares stationary under adverse conditions. The instant flare base comprises a planar cleated base member having apertures disposed therein, said apertures being capable of receiving tubular flare supporting members. The apertures of one flare base may be aligned sequentially with tubular members on other of said flare bases to comprise a compact stackable assembly.

18 Claims, 3 Drawing Sheets

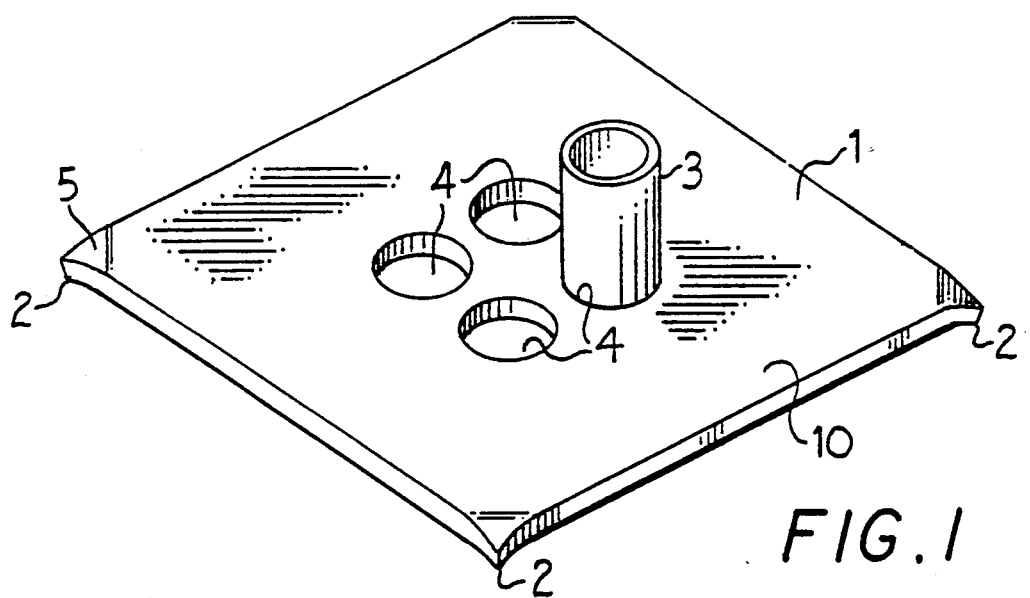
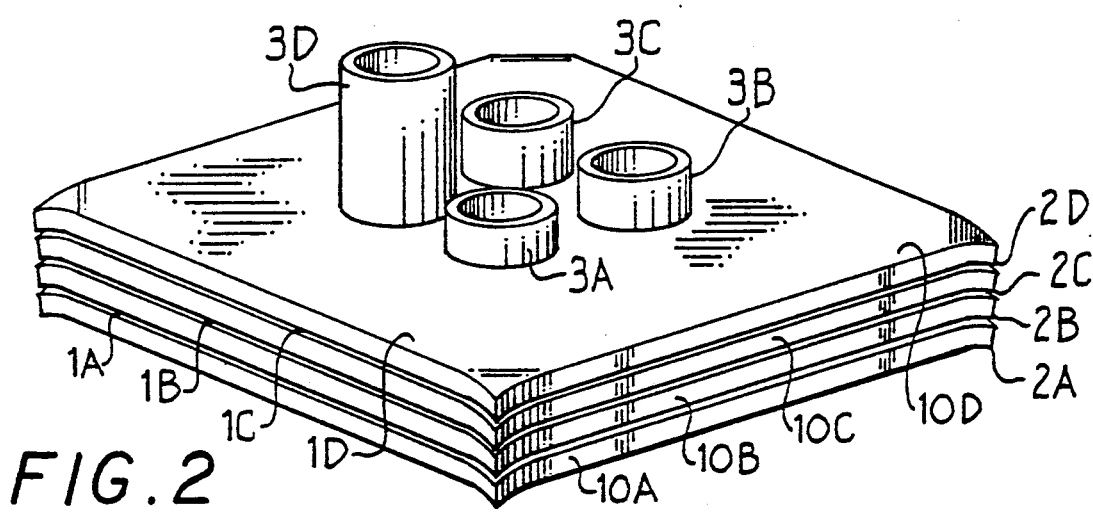
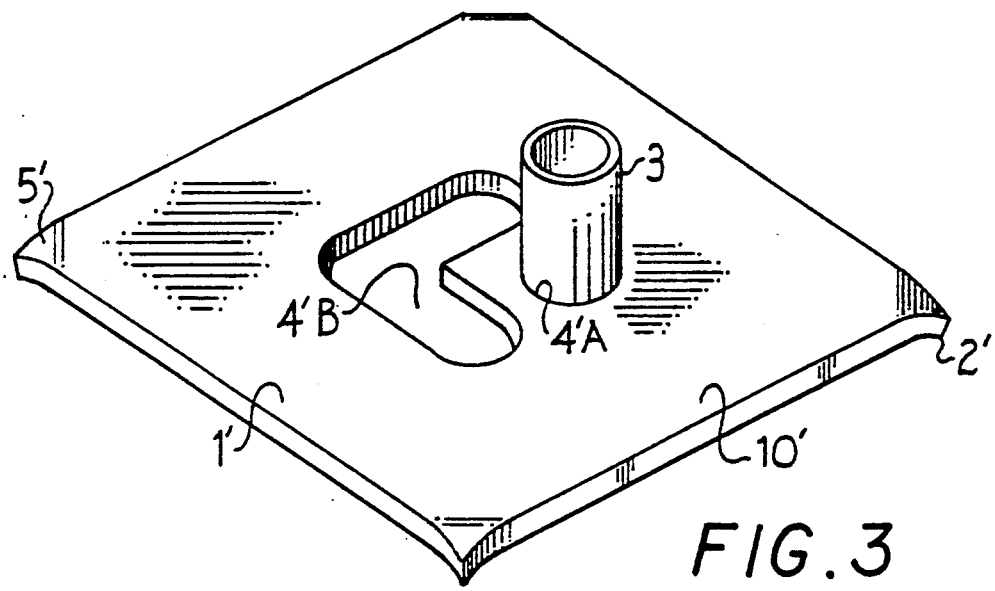

STACKABLE FLARE BASE

BACKGROUND OF THE INVENTION

This invention relates to flareholders that are used in emergency situations such as at helicopter landing sites or accident scenes. Combustible flares are important signaling means that are used at the scene of an accident or at air vehicle landing sites. Some conventional flares may have a built in spike or nail at one end which is driven into the ground to serve as a support for the flare. Other conventional flares may not have a built-in holder and can be held by the user or supported by a flareholder.

Various flareholders have been suggested to solve problems generated by the spike flare or the holderless flare. The spike flare cannot be inserted into a concrete or asphalt roadway and needs some other kind of support. U.S. Pat. No. 3,905,324 (the "'324 patent") describes a flareholder apparatus capable of receiving and supporting the spike. However, the flareholder of '324 patent is adapted to only the spike flare and is susceptible to sliding on slippery surfaces or on moving or tilting surfaces such as those present on a boat. Furthermore, the '324 flareholder is a bulky device and if more than one flare location is desired and more than one flareholder is needed, multiple flareholders would take up an appreciable amount of storage space before use.

Unsupported flares without built-in holders also can present problems. If the flare is laid down on the ground, its visibility may be compromised, a fire could start, or the surface of the ground could be damaged. It may not be practical for the flare to be held by a person for any length of time due to heat from the flare or fatigue. Various flareholders have been suggested for holderless flares such as U.S. Pat. No. 4,148,259 (the "'258 patent"), which describes a road flareholder. However, the '258 flareholder presents numerous shortcomings. For example, more than one '258 flareholder does not store in a compact space. The '258 flareholder also may tip over or slide in a windy and/or slippery environment. Furthermore, although one embodiment is comprised of a bottom to prevent a flare from sliding through, the flareholder would be difficult to clean once the flare had been used up. In the embodiment without the bottom, the flare may slide through if the entire holder apparatus was lifted off the ground or if the apparatus was placed on uneven or rocky terrain.

The instant invention is designed for emergency operations and solves all the aforementioned problems, among others. Accordingly, it is an object of this invention to provide a flare base that will not slide under adverse conditions.

Another object of this invention is to provide a means for storing flare bases in a minimum of space.

Yet another object of this invention is to provide a means for preventing a flare from falling through the flareholder while remaining easy to clean once the flare is spent.

A further object of the invention is to provide a means for reducing the amount of ash that drops off a burning flare from coming in contact with the ground.

A still further object of the invention is to provide a means for preventing a flare or flareholder from tipping over in high winds.

Other objects and advantages of this invention will be appreciated by those skilled in the art by reference to the following specification and accompanying drawings.

SUMMARY OF THE INVENTION

The instant flare base comprises a stackable planar base member having at least one corner tilted downward to form a cleat or cleats. The base member has one or more apertures capable of holding an outwardly projecting flare receiving tubular member. The tubular member may be comprised of an obstruction means for preventing a flare from falling through. The apertures are further adapted to be aligned with corresponding apertures on other base members. The tubular members are adapted to be inserted through the apertures of the base members to create a relatively snug fit between each respective base member when one or more flare bases are stacked on top of each other. The tubular members may lie canted from an angle of about 90° to about 30° in relation to the planar base member. In one embodiment of the invention a handle means is adapted to the flare base.

BRIEF DESCRIPTION OF THE DRAWINGS

FIG. 1 is a perspective view of a stackable flare base depicting a base member, four apertures and one tubular member.

FIG. 2 is a perspective view of four flare bases that are stacked one on top of another.

FIG. 3 is a perspective view of a stackable flare base depicting a base member with two apertures and one tubular member.

DETAILED DESCRIPTION OF THE INVENTION

Figure 4:
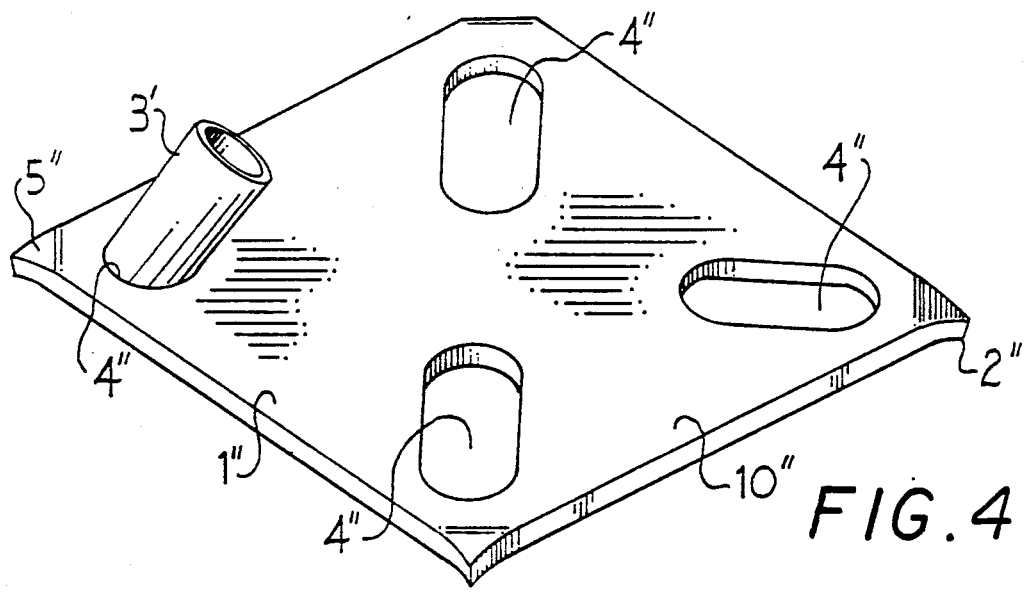
FIG. 4 is a perspective view of a stackable flare base depicting a base member, four apertures and a canted tubular member.

FIG. 1 illustrates a preferred embodiment of the instant flareholder 10. It includes a substantially square planar base member 1 which may have sides that are typically about five to ten inches, and preferably eight inches long. The corners 5 of each base member 1 are bent downwardly to form a cleat 2.

The base member 1 is further comprised of apertures 4 which are capable of supporting or allowing a tubular member 3 to be inserted therethrough. The tubular member 3 is typically about one or more inches and preferably about two inches high. The tubular member 3 is seen to project upwardly at about a 90° angle relative to the base member 1.

The tubular member 3 is affixed to one of the apertures 4 by means of welding or other adhesive means such as epoxy resin or the like. Both the tubular member 3 and the base member 1 can be made of steel or other materials suitable for providing resistance to heat and stress. When the base member 1 is constructed of 3/16"

steel, the weight of base member 1 helps to keep the flare base 10 stationary. The cleats 2 are designed to substantially eliminate sliding on any surface, whether it be ice, snow and/or tilted. The broad surface area of the base member 1 also serves to act like a "snow shoe" and thus prevents the flareholder 10 from sinking in mud or snow. Furthermore, the base member 1 is designed to catch hot ash from a burning flare and prevent the ash from contacting the ground.

The tubular member 3 permits insertion of a flare and is designed to fit loosely around the flare to facilitate removal of the flare. In the event that the flare is defective and explodes, a loose fit (as opposed to a tight fit) serves to avoid generation of shrapnel. The tubular member 3 may be left open at the bottom to further facilitate removal of the flare.

Four apertures 4 are seen to be equidistant from each other and from the center of the square base member 1. Such arrangement insures that the tubular member 3, when affixed to the base member 1, by means of an aperture 4, will align with and be capable of insertion through corresponding apertures 4 on other of the instant flare bases 10 when the flare base 10 is stacked in succession as is described below.

Turning to FIG. 2, the instant invention is shown in its stacked embodiment. FIG. 2 illustrates an assembly of four flare bases 10A, 10B, 10C and 10D stacked one on top of the other. Each of the base members 1D, 1C and 1B is seen to rest cleanly on top of the base member immediately below it. When stacking the flare bases, in order to insure that each flare base 10 is properly received by the flare base 10 below it, each successive flare base is rotated by 90° relative to the tubular member 3 below it.

For example, flare base 10A is shown in FIG. 2 at the bottom of the assembly. Flare base 10B fits over flare base 10A by first aligning tubular member 3B over tubular member 3A and then rotating the flare base 10B by 90° and placing it down on flare base 10A such that tubular member 3A fits through an unoccupied aperture 4 of the flare base 10B. Then the next flare base 10C in the assembly is seen to fit over flare base 10B by first aligning tubular member 3C over tubular member 3B and rotating flare base 10C by 90° (180° from tubular member 3A) and placing it down on flare base 10B such that tubular members 3A and 3B both fit through the unoccupied apertures 4 of flare base 10C. In a similar manner, the uppermost flare base 10D fits over flare base 10C by first aligning tubular member 3D over tubular member 3C and rotating flare base 10D by 90° (270° in relation to flare base 10A) and placing it down on flare base 10C such that tubular members 3A, 3B and 3C all fit through the unoccupied apertures 4 of flare base 10D. Thus, all the flare bases 10A, 10B, 10C and 10D are stacked to form a compact assembly.

Turning now to FIG. 3, a flare base 10' containing two apertures 4'A and 4'B is depicted. The base member 1' is much the same as the base member 1 in FIG. 1 except one aperture 4'A is circular and the other aperture 4'B is "L" shaped with hemispherical ends and corners. The flare base 10' is thus adapted to be stacked as above with tubular members 3 inserted through the "L" shaped aperture 4'B in the same successive fashion as in the above example.

FIG. 4 illustrates another embodiment of the flare base 10" in which the tubular member 3' lies canted toward the center of the base member 1" at an angle of from about 30° to about 90°. Four elongated apertures 4" are seen to be disposed at approximately 45° angles relative to the corners of the base member 1". Said apertures 4" are adapted to receive the canted tubular member 3' when the flare base 10" is placed in a stacked assembly, i.e., the smaller the angle of the canted tubular member 3', the more elongated the aperture 4". The elongated apertures 4" are equidistant from each other and from the center of the base member 1" to insure stackability of the assembly. The flare base 10" may be stacked in the same manner as was described in relation to FIG. 2, i.e., the tubular members 3" are aligned and successively rotated by 90° until four flare bases 10" are stacked in compact fashion.

Figure 5:
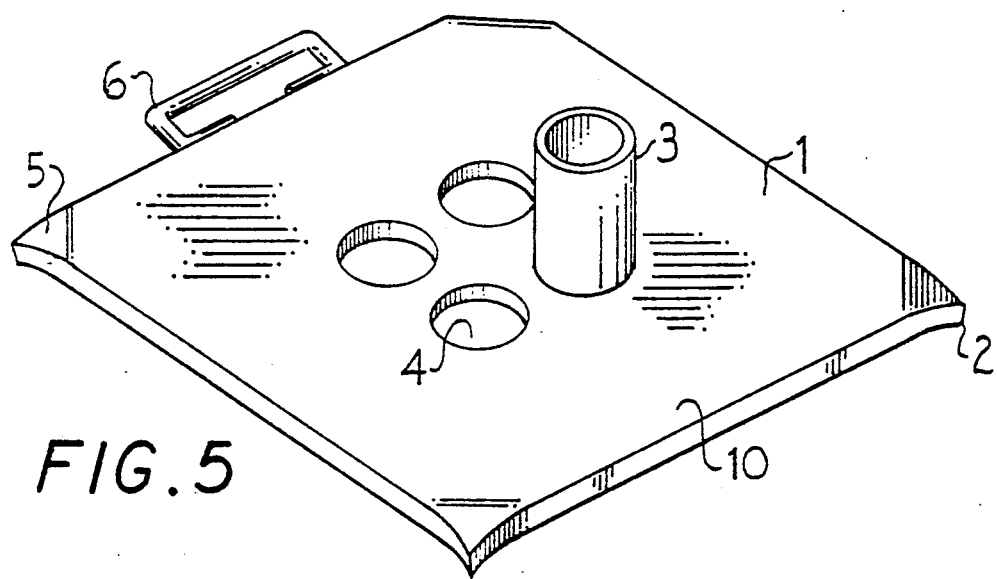
FIG. 5 is a perspective view of the flare base with a handle means affixed thereto.

FIG. 5 depicts the flare base 10 with a handle 6 affixed to the base member 1. The handle 6 may be immovably attached by welding or other adhesive means that are known to those with skill in the art. In the alternative, the handle 6 may be pivotally attached to the base member 1 by such means that are known to those with skill in the art.

Figure 6:
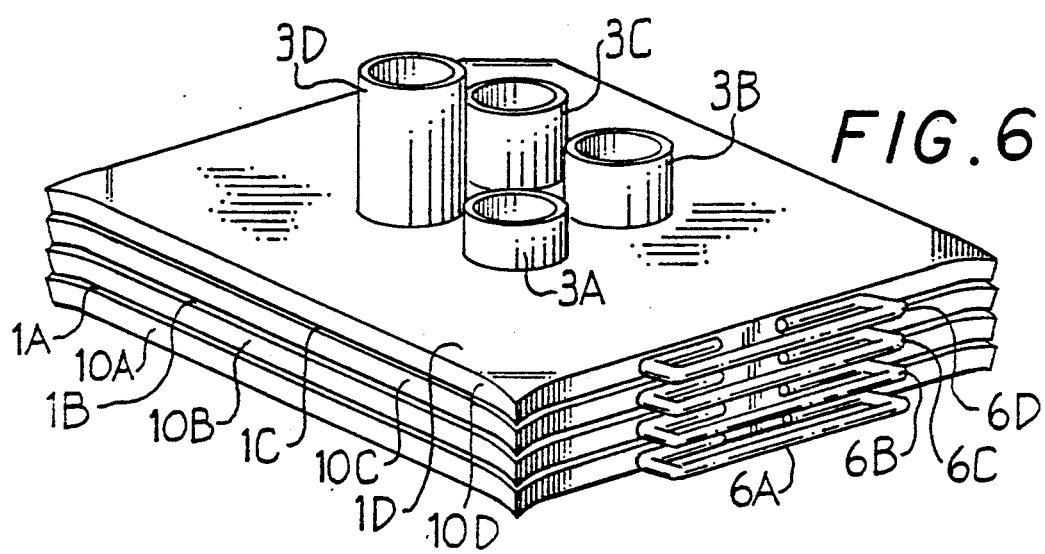
FIG. 6 is a perspective view of the flare base of FIG. 5 depicting four bases with handles stacked one on top of the other.

FIG. 6 illustrates the flare base 10 assembly with handles arranged in the stacked embodiment. Each flare base 10A, 10B, 10C and 10D in the assembly has a handle attached to a different side of the base members 1A, 1B, 1C and 1D in relation to the tubular members 3A, 3B, 3C and 3D. Thus, when the flare bases are stacked and each individual flare base is rotated 90° in relation to the flare base below it, the handles 6A, 6B, 6C and 6D will all be located and aligned on one side of the complete assembly.

Figure 7:
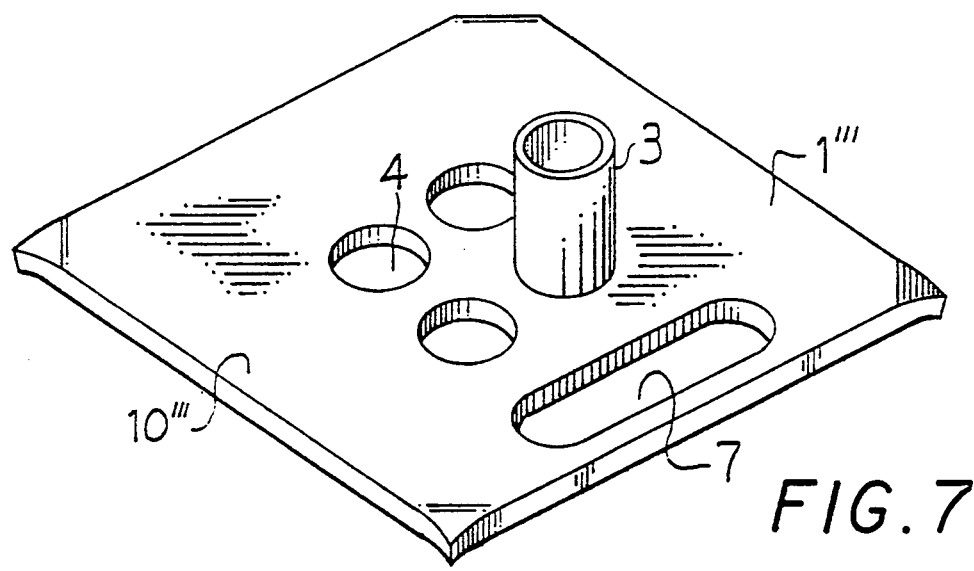
FIG. 7 is a perspective view of the flare base depicting a handle means disposed therein.
Figure 8:
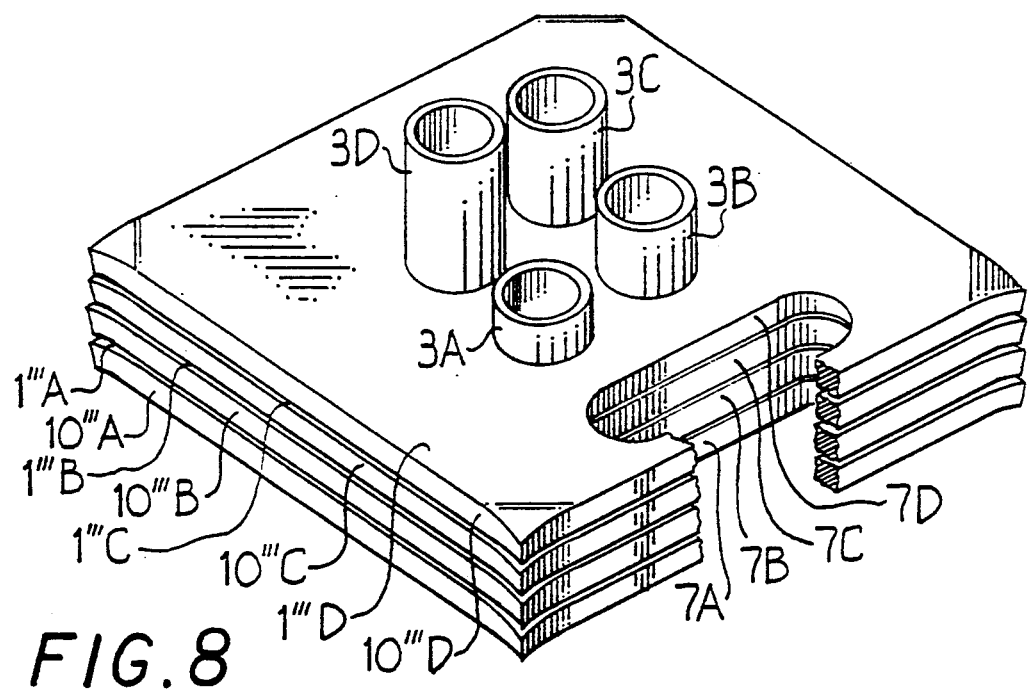
FIG. 8 is a perspective view of the flare base of FIG. 7 depicting four bases stacked one on top of the other.

FIG. 7 illustrates another handle embodiment of the flare base 10'''. An elongated aperture handle 7 capable of being grasped by a hand is disposed near a side of the base member 1'''. FIG. 8 illustrates the stacked assembly of the flare base 10'''. Each elongated aperture handle 7A, 7B, 7C and 7D is positioned at a different side of the base member 1''' in relation to the tubular members 3A, 3B, 3C and 3D in each flare base in the assembly. Thus, when the flare bases are stacked and each individual flare base is rotated 90° in relation to the flare base below it, the elongated aperture handles 7A, 7B, 7C and 7D will all be located and aligned on one side of the complete assembly.

Figure 9:
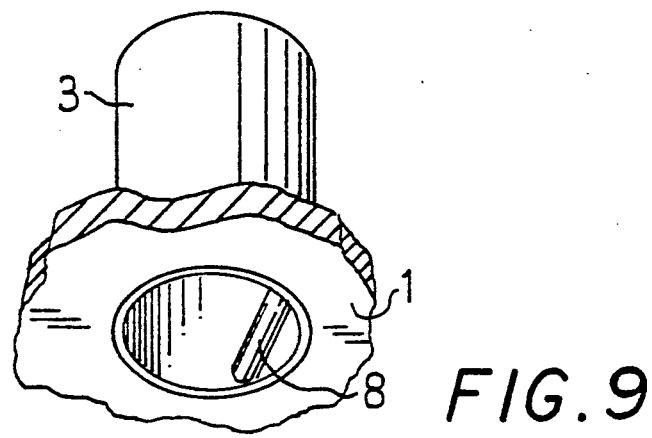
FIG. 9 is fragmentary view of the tubular flare receiving means further depicting a rod-shaped obstruction means.

FIG. 9 is a fragmentary view of the flare base 10 and of the tubular member 3 depicting an obstruction means 8 which prevents a flare from falling through the flare base 10. The obstruction means 8 may partially obstruct the bottom of the tubular member 3 to allow a spent flare to be ejected by reaming the flare from the bottom of the tubular member 3. In a preferred embodiment, the obstruction means 8 is a rod that is placed off-center as a secant across the bottom of the tubular member 3. The obstruction means 8 is placed off-center to enable the use of flares that have nails inserted at the bottom. Thus, the nail will fit past the obstruction means 8 and allow insertion of the flare into the base.

All the drawings accompanying this description depict a square planar base member 1. It is contemplated, however, that other geometrical shapes are within the scope of the instant invention. For example, polygonal shapes are also well suited to the instant invention. A pentagonal planar base member with five apertures and one tubular member is within the spirit of the invention. Each corner of the pentagon can be bent downward to form a cleat. The pentagonal flare base is also stackable in the same manner as the square flare base. The pentagonal flare base would thus be capable of stacking five individual flare bases. The base member may also be triangular, hexagonal, heptagonal, etc. with a corresponding number of apertures in each case. In accord with principles of the invention, a three-sided base would be capable of stacking three flare bases high and a six-sided base would be capable of stacking six flare bases high, etc. A circular base member is also contemplated by the instant invention. In such a case the entire edge of the circular base or a portion or portions thereof could be bent down to form a continuous cleat and stackability would be limited only by the number of apertures disposed within the circular base.

It will be understood by those skilled in the art that the foregoing specification is not intended to limit the invention to the embodiments described. On the contrary, it is intended to cover all alternatives, modifications and equivalents within the spirit and scope of the inventive concept.

What is claimed is:

1. A flare base comprising a base member having a planar portion substantially parallel with a surface upon which said base member rests, said base member having at least one corner tilted downwardly to form a pointed cleat extending below said planar portion of said base member, said base member having disposed therein one or more apertures, at least one of said apertures having an outwardly projecting tubular member disposed therein, said tubular member adapted to receive a flare.

2. The flare base of claim 1 wherein said outwardly projecting tubular member is further comprised of an obstruction means capable of preventing a flare from falling through said tubular member.

3. The flare base of claim 2 wherein said outwardly projecting tubular member is partially obstructed by said obstruction means, said obstruction means being disposed in an area less than the diameter of said tubular member.

4. The flare base of claim 3, wherein said obstruction means is comprised of a rod across the bottom of said tubular member on the same plane as said planar base member wherein said rod is placed as an off-center secant.

5. The flare base of claim 1, wherein said outwardly projecting tubular member comprises means capable of fitting loosely around a flare.

6. The flare base of claim 3 wherein said planar base member is a square further comprised of four substantially 90° corners that are each tilted downwardly to form four pointed cleats, said planar base member further comprised of four circular apertures, each said circular aperture equidistant from the others and from the center of said square, one of said four circular apertures having an outwardly projecting tubular member disposed therein.

7. The flare base of claim 1 wherein a handle means is affixed to said planar base member.

8. The flare base of claim 1 wherein said outwardly projecting tubular member lies canted at an angle of from about 90° to about 30° in relation to said planar base member.

9. A flare base assembly comprising a predetermined number of stackable planar base members, said base members having at least two apertures which are spaced apart, at least one of said apertures on each base member having an outwardly projecting tubular member disposed therein, said tubular member adapted to receive a flare, at least one other of said apertures being open, said apertures adapted to be aligned with corresponding apertures on other of said base members, said tubular member adpated to be inserted through the aligned apertures of each other base member which do not have an outwardly projecting tubular member disposed therein.

10. The flare base assembly of claim 9 wherein said planar base members are each comprised of the same predetermined number of corners, each of said corners tilted downwardly to form a pointed cleat.

11. The flare base assembly of claim 9 wherein said outwardly projecting tubular member is further comprised of an obstruction means capable of preventing a flare from falling through said tubular member.

12. The flare base assembly of claim 11 wherein said outwardly projecting tubular member is partially obstructed by said obstruction means, said obstruction means being disposed in an area less than the diameter of said tubular member.

13. The flare base assembly of claim 12 wherein said obstruction means is comprised of a rod across the bottom of said tubular member on the same plane as said planar base member wherein said rod is placed as an off-center secant.

14. The flare base assembly of claim 9 wherein said outwardly projecting tubular member comprises means capable of fitting loosely around a flare.

15. The flare base assembly of claim 9 further comprising a handle means.

16. The flare base assembly of claim 9 wherein at least one of said outwardly projecting tubular members is canted at an angle of from about 90° to about 30° in relation to said planar base members.

17. The flare base assembly of claim 9, wherein said planar base members are squares of substantially equal size, each said square planar base member are having one or more corners tilted downwardly to form pointed cleats, each said square planar base member further comprised of four circular apertures, each said circular aperture equidistant from the others and from the center of said square, each said square planar base member having one said outwardly projecting tubular member.

18. A flare base assembly comprising a predetermined number of stackable planar base members, said base members having at least two apertures which are spaced apart, at least one of said apertures on each base member having an outwardly projecting tubular member disposed therein, said tubular member adapted to receive a flare, said apertures adapted to be aligned with corresponding apertures on other of said base members, said tubular members adapted to be inserted through the aligned apertures of each other base member which do not have an outwardly projecting tubular member disposed therein, said base members adapted to be aligned such that a majority portion of each base member covers a majority portion of a corresponding adjacent base member.

* * * * *